United States Patent
Small et al.

(10) Patent No.: US 6,223,765 B1
(45) Date of Patent: May 1, 2001

(54) CASING CONSTRUCTION FOR FUEL DISPENSING SYSTEMS

(75) Inventors: Dorsey D. Small, Port Byron, IL (US); Martin J. Traver, Wheatland, IA (US); David S. Young; G. Todd Clark, both of Maquoketa, IA (US); Robert Joe Schwan, Davenport, IA (US)

(73) Assignee: Marley Pump, Overland Park, KS (US)

( * ) Notice: Subject to any disclaimer, the term of this patent is extended or adjusted under 35 U.S.C. 154(b) by 0 days.

(21) Appl. No.: 08/948,347

(22) Filed: Oct. 9, 1997

(51) Int. Cl.[7] .............................. B65B 31/04; B67D 5/04; F16K 43/00
(52) U.S. Cl. .......................... 137/312; 137/315; 141/59; 141/86; 141/198; 222/67; 222/110; 222/318
(58) Field of Search ................... 73/40.5 R, 46, 73/49.1, 49.2; 137/15, 312, 315, 540, 541, 542, 565; 141/59, 86, 95, 198; 222/52, 67, 69, 318, 108, 110

(56) References Cited

U.S. PATENT DOCUMENTS

| | | | | |
|---|---|---|---|---|
| 3,183,723 | * | 5/1965 | Deters ..................................... | 222/52 |
| 3,905,405 | * | 9/1975 | Fowler et al. .......................... | 141/59 |
| 3,913,633 | * | 10/1975 | Hiller ..................................... | 141/59 |
| 3,915,206 | * | 10/1975 | Fowler et al. .......................... | 141/59 |
| 3,981,335 | * | 9/1976 | Deters .................................... | 141/59 |
| 4,256,151 | * | 3/1981 | Gunn ..................................... | 141/59 |
| 4,508,139 | * | 4/1985 | Teumer .................................. | 137/315 |
| 4,842,163 | * | 6/1989 | Bravo .................................... | 137/312 |
| 5,301,721 | * | 4/1994 | Hartmann .............................. | 137/312 |
| 5,673,732 | * | 10/1997 | Kenney et al. ......................... | 141/59 |

\* cited by examiner

Primary Examiner—George L. Walton
(74) Attorney, Agent, or Firm—Shook, Hardy & Bacon LLP (57) ABSTRACT

A casing which provides a fluid and electrical interface between components of a fuel dispensing system. A column pipe which receives fuel pumped from an underground tank connects with a power head mounted in the casing. A check valve controls flow from the power head to a dispensing pipe leading to a fuel dispenser. A hand operated quick connect coupling connects the power head with the check valve housing to facilitate extraction of the power head, column pipe and pump. The check valve element can be removed along with a cover to the check valve housing. Leaking fuel and excessive fuel vapor are returned to the tank by valves. Fuel from the check valve housing used to operate a siphon system is returned to the tank along with fuel needed to relieve excessive pressure in the check valve housing. A junction box in the casing houses electrical wiring and is equipped with a safety barrier plug that accommodates a signal wire from a pressure transducer used to control the fuel flow to the dispenser.

28 Claims, 7 Drawing Sheets

CASING CONSTRUCTION FOR FUEL DISPENSING SYSTEMS

FIELD OF THE INVENTION

This invention relates generally to the dispensing of fuels and more particularly to a novel casing which provides an interface for the flow pipes and electrical conductors in a fuel dispensing system.

BACKGROUND OF THE INVENTION

At gasoline service stations and other facilities that dispense fuel, underground tanks are commonly installed for storage of the fuel. A submersible electric pump operates to pump the fuel through a vertical column pipe when the dispenser is activated. The fuel is then delivered to a dispensing line which extends to a dispenser having a nozzle that discharges the fuel under the control of the service station attendant or customer.

The fuel path includes an interface between the column pipe and the dispensing line. Electrical power must also be supplied to the submersible pump from a power source which may be located in a building or other area. Conventionally, an assembly referred to as a packer or a manifold forms the interface section of the flow path and also allows electrical lines to extend through the column pipe in an electrical conduit leading to the pump.

The packer/manifold assemblies that have been used in the past have not been altogether without problems. Any fuel that leaks from the piping should be contained, and packers have not always been able to provide satisfactory containment. Consequently, leaking fuel can contaminate the area and can create environmental problems and violations of regulatory laws. Excess vapor pressure from the fuel can also cause similar problems.

The packer assembly is normally equipped with a check valve which holds the line pressure to the dispenser in order to assure that fuel is immediately available for each dispensing cycle. Proper maintenance procedures require that the check valve be inspected and serviced at suitable intervals. Often, it is necessary to disassemble and reassemble a number of components in order to obtain access for removal of the check valve. The complexity of this procedure adds to the maintenance costs and the down time of the equipment.

The column pipe and pump must also be removed and serviced periodically. Again, this can be a complicated procedure because the components of the packer assembly between the column pipe and the check valve must be disconnected and then reconnected after maintenance operations have been completed. Tools are required for assembly and disassembly of the components, and this adds both to the cost of the maintenance and to the time the system is out of service.

SUMMARY OF THE INVENTION

The present invention is directed to a casing which provides an improved flow interface between the column pipe and the dispensing pipe and also provides an improved electrical interface between the power leads and the supply wires extending to the submersible pump.

In accordance with the invention, a fluid tight casing has a threaded connection with a riser pipe extending from an underground fuel storage tank. A power head mounted in the casing has a threaded connection with a column pipe through which fuel is pumped from the tank by a submersible pump. An electrical conduit extending in the column pipe contains electrical wiring for operating of the pump. The power head provides a flow path for the fuel that turns through a 90° angle within the casing.

A check valve housing is mounted in the casing and connects with a dispensing pipe which leads to the fuel dispenser. Fuel from the power head flows into the check valve housing through a check valve which is urged toward a closed position by a spring that allows the check valve to open under the influence of the force of the fluid when the pump is in operation. The check valve is mounted on a post and stem assembly directly carried on a lid for the valve housing. As a result, the check valve can be removed along with the lid in order to facilitate servicing of the check valve and related components.

The flow path from the power head and check valve housing is equipped with a quick connect coupling that can be clamped and unclamped without the need for tools. Consequently, when the casing cover is removed, the coupling can be unclamped and the power head, column pipe and pump can be withdrawn from the casing as a unit for servicing.

The casing is fluid tight and is thus able to serve a secondary containment function to contain any fuel leaking from the flow line. A float valve opens a drain to return fuel to the tank when the accumulation of fuel on the floor of the casing reaches a selected level. Excessive fuel vapor in the casing is likewise returned to the tank through a pressure relief valve. Excess pressure downstream from the check valve is relieved by an expansion relief valve, and the fuel in this relief line is directed back to the tank through the power head.

Due to the unique construction and arrangement of the casing and the components associated with it, leaking fuel is contained and returned to the tank, excessive vapor pressure is relieved, and the safety of the fuel dispensing system is enhanced by these features, as well as by an intrinsic safety barrier plug which is installed in the casing to isolate the electrical lines from the fuel. In addition, removal and servicing of the components can be carried out quickly and easily to minimize the maintenance costs while providing ready access to the parts that require periodic maintenance.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
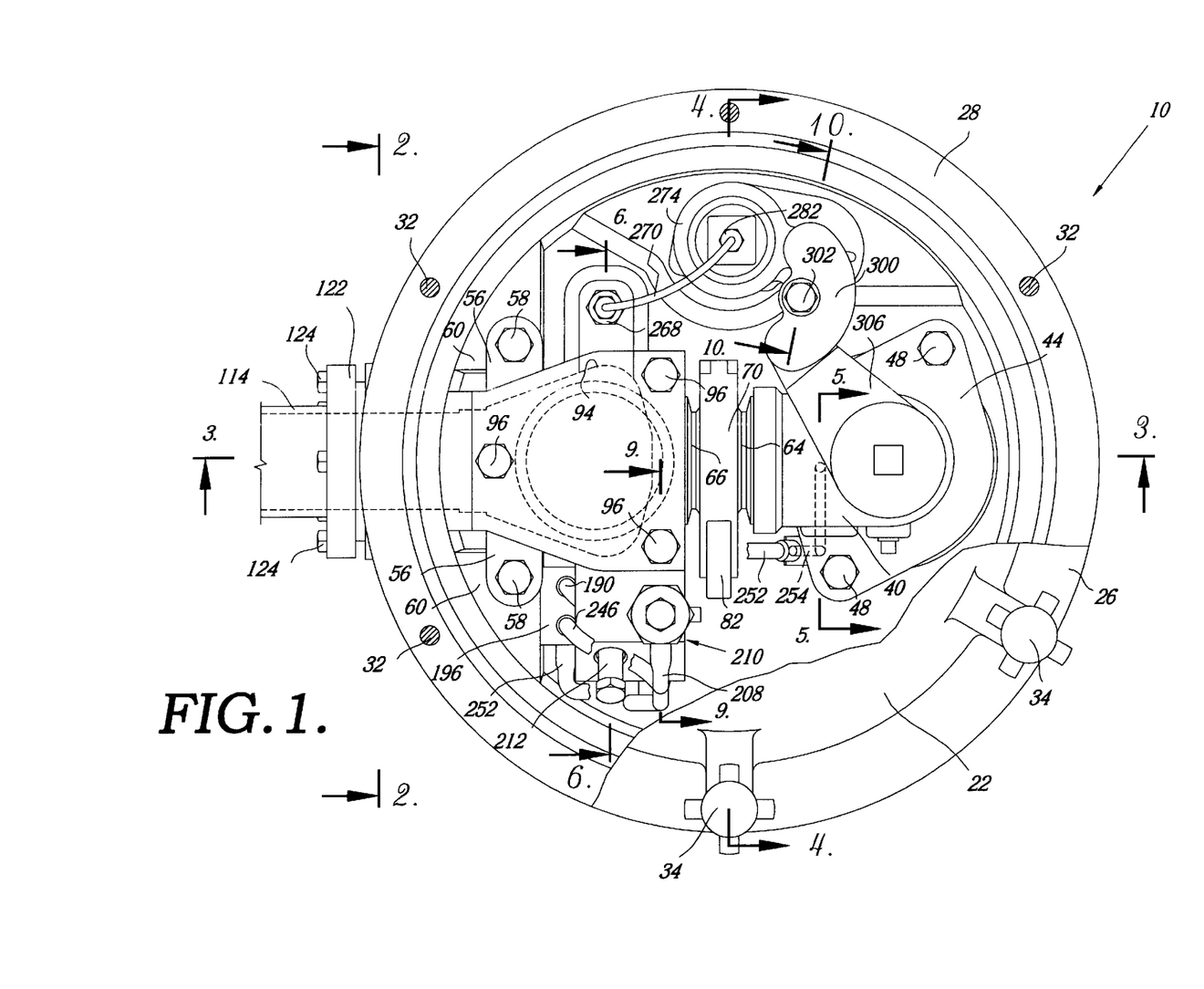
FIG. 1 is a top plan view of a casing which is used as an interface in a fuel dispensing system, with a portion of the cover of the casing broken away for purposes of illustration.
Figure 2:
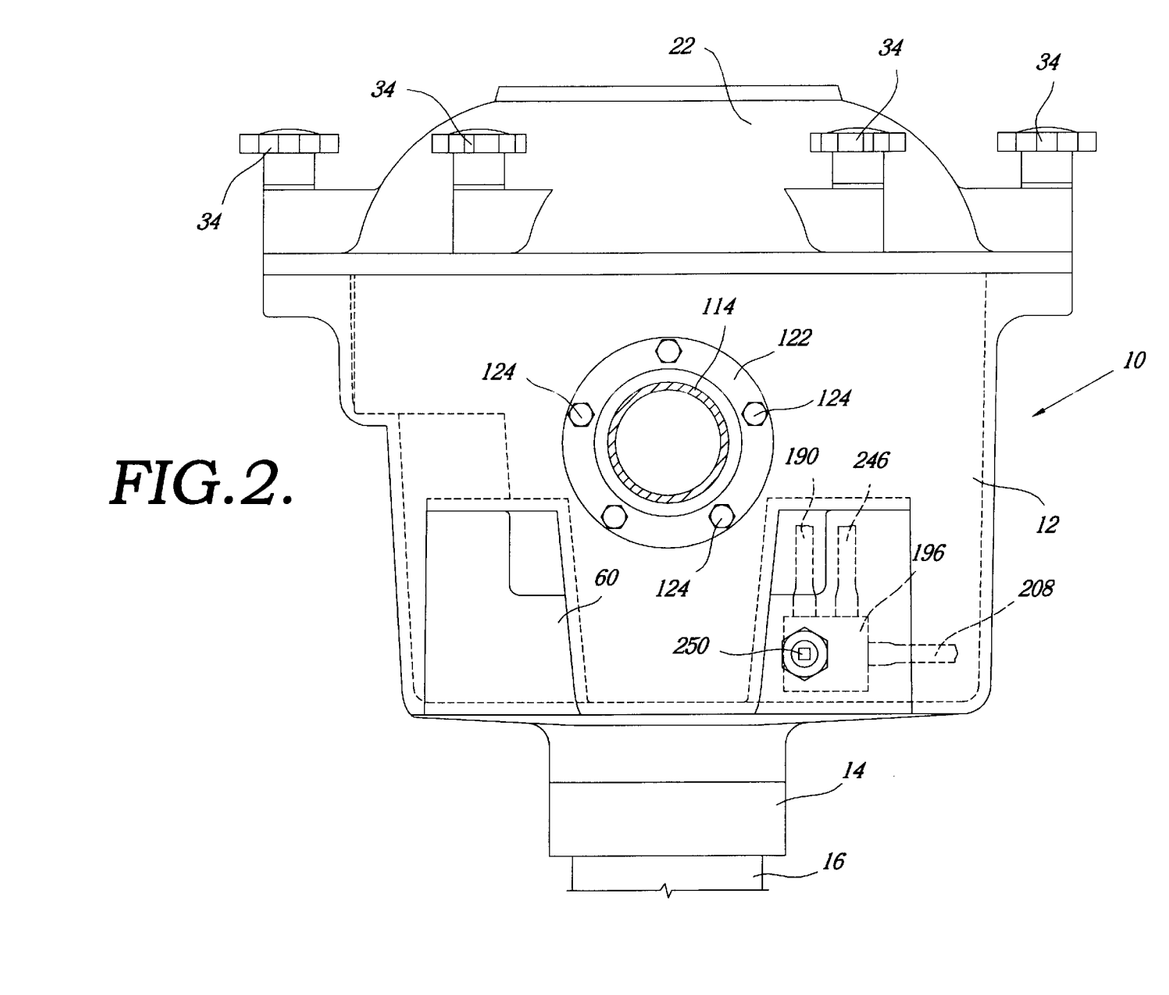
FIG. 2 is a front elevational view of the casing taken generally along line 2—2 of FIG. 1 in the direction of the arrows.
Figure 3:
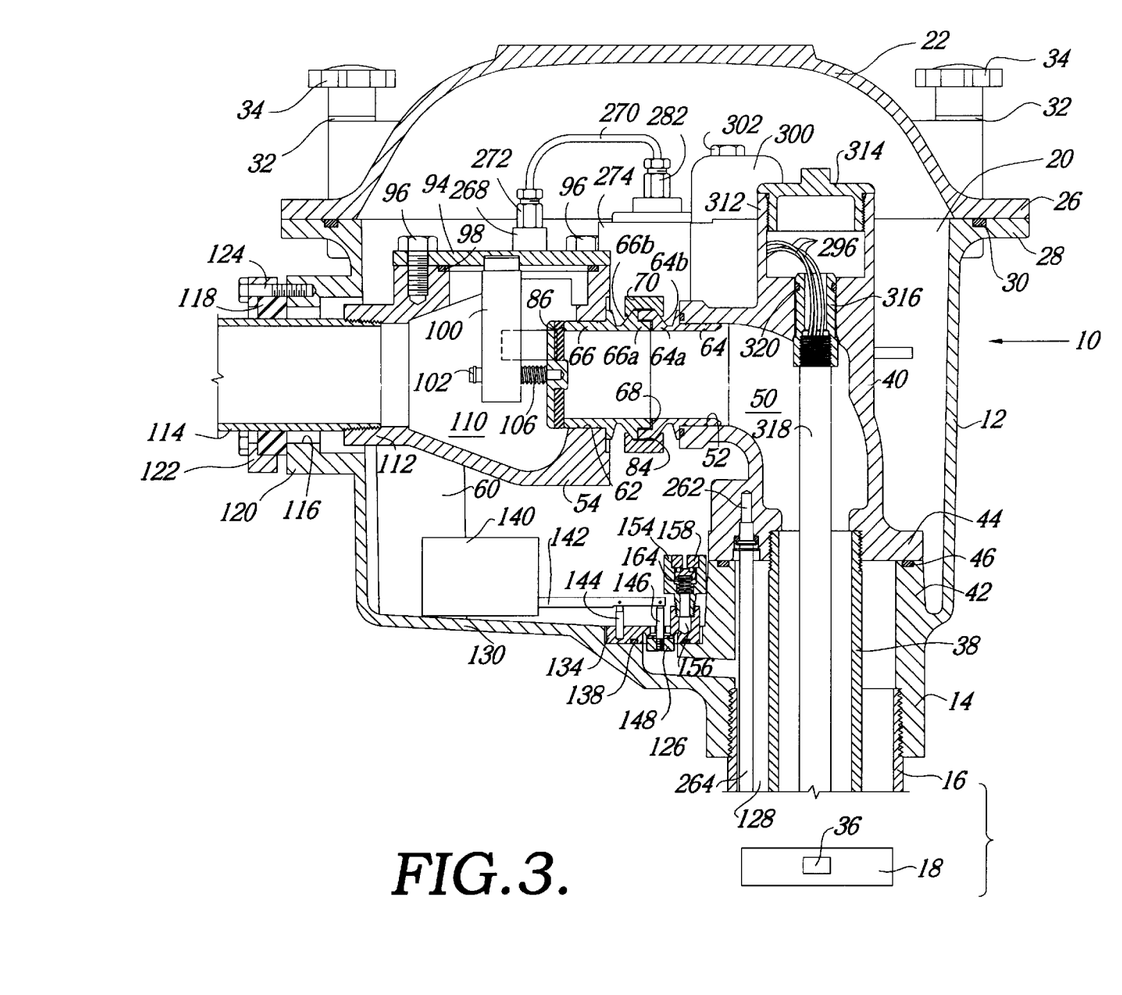
FIG. 3 is a sectional view taken generally along line 3—3 of FIG. 1 in the direction of the arrows.

Referring now to the drawings in more detail and initially to FIGS. 1–3, numeral 10 generally designates a fluid tight casing which is used as part of a fuel dispensing system such as the type of system commonly found at service stations and similar facilities. The casing 10 has a body 12 which is generally cylindrical. A downwardly projecting neck 14 is provided on the body 12 and is internally threaded for connection with the top end of a large riser pipe 16. The riser pipe 16 is secured on top of an underground storage tank 18 (see FIG. 3) which holds the fuel that is to be dispensed. The riser pipe 16 rests on the tank 18 at a tank opening, and the weight of the casing body 12 and the components it holds is thus borne by the tank 18.

Figures 4, 5:
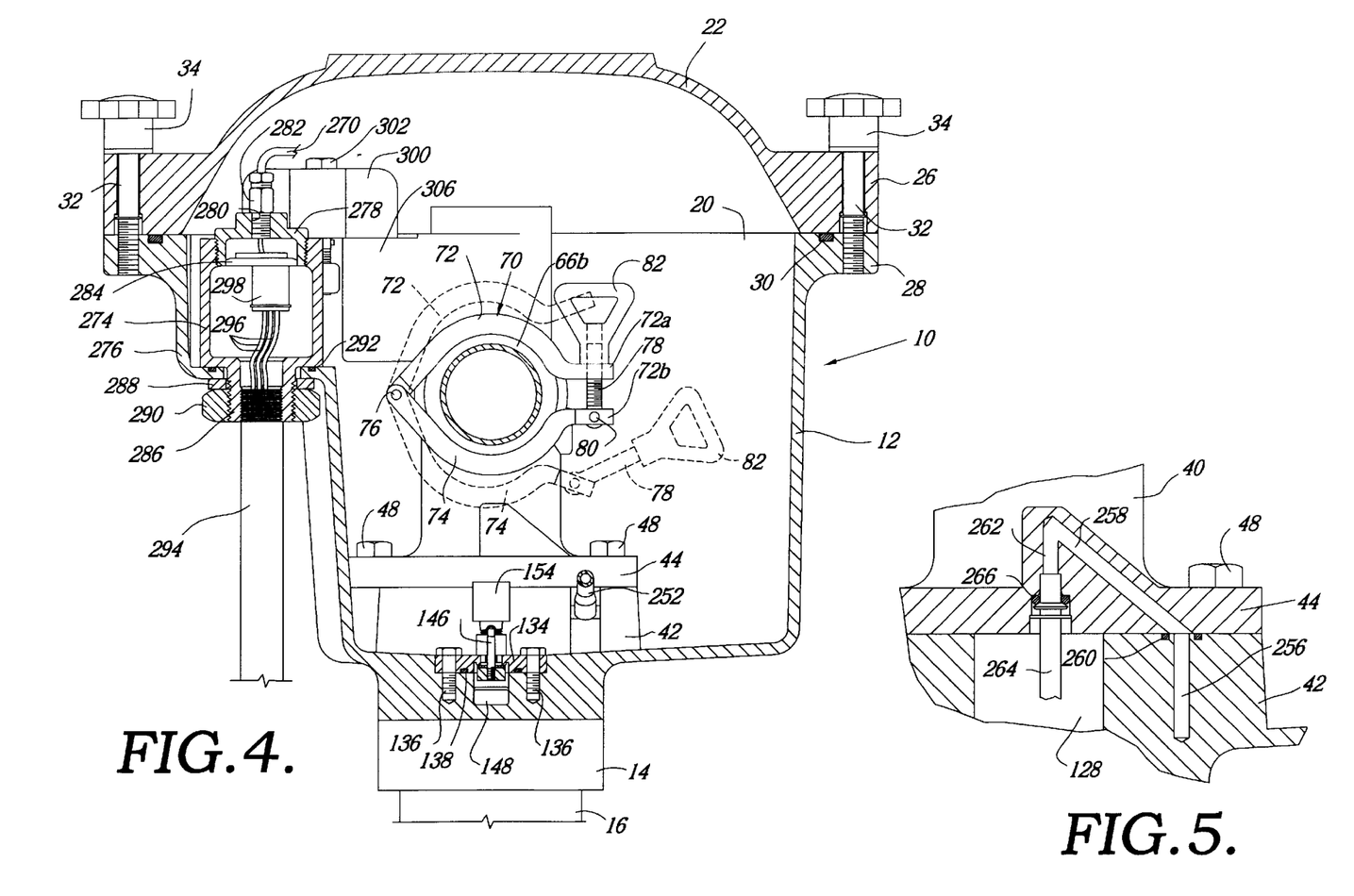
FIG. 4 is a sectional view taken generally along line 4—4 of FIG. 1 in the direction of the arrows, with the broken lines indicating the release position of a clamp used to secure the quick connect coupling.
FIG. 5 is a fragmentary sectional view on an enlarged scale taken generally along line 5—5 of FIG. 1 in the direction of the arrows.

With particular reference to FIG. 4, the casing body 12 has an open top 20 that is normally closed by a removable cover 22. The cover 22 has a peripheral flange 26 which seats flatly on top of a peripheral flange 28 extending outwardly on the upper end of the body 12. A seal ring 30 seals the flanges 26 and 28 together.

The cover 22 is secured in place by a plurality of bolts 32 which may be tightened down to secure the flanges 26 and 28 together. The upper ends of the bolts 32 have handles or knobs 34 which allow them to be tightened and loosened by hand. When the cover 22 is in place on the body 12, the casing 10 is fluid tight. The casing cover 22 can be removed to provide access to the interior of body 12 through the open top 20.

A submersible electric pump 36 (FIG. 3) operates in the tank 18 to pump fuel from the tank through a vertical column pipe 38 which extends from the pump 36 upwardly through the riser pipe 16 and into the casing body 12 through the neck 14. The top end of the column pipe 38 is threaded into the bottom end of a power head 40 which is mounted within body 12 on a boss 42 extending upwardly from the floor of the casing. A flanged base 44 on the lower end of the power head 40 seats on top of the boss 42 and is sealed to the boss by an O-ring 46. As shown in FIG. 1, two bolts 48 are extended through the base 44 and threaded into the boss 42 in order to secure the power head 40 in the casing.

The interior of the power head 40 is hollow to provide a flow passage 50 for fuel which is pumped into the power head through the column pipe 38. The lower portion of the flow passage 50 is vertical, and the flow passage then makes a smooth 90° turn such that the flow path directs the fuel in a horizontal direction at the time it leaves the power head 40 through a discharge opening 52.

A check valve housing 54 is mounted in the casing body 12 at a location downstream from the power head 40. As best shown in FIG. 1, the check valve housing 54 has opposing mounting lugs 56 which are secured by bolts 58 to pedestals 60 extending upwardly from the floor of the casing body 12. The check valve housing 54 has an inlet opening 62 which is spaced downstream from and aligned with the discharge opening 52 of the power head 40. Normally connecting the openings 52 and 62 is a quick connect coupling assembly which includes a pair of couplings 64 and 66 which are pressed into the openings 52 and 62, respectively. When the couplings 64 and 66 are coupled together as shown in FIG. 3, they have mating ends 64a and 66a which are sealed together by a flat seal ring 68. The couplings 64 and 66 have tapered surfaces 64b and 66b near the mating ends which ramp toward each other at an incline to the flow axis as they extend outwardly away from the bodies of the couplings.

A clamp 70 is used to secure the couplings 64 and 66 together and yet allow them to be quickly and easily released from one another. As best shown in FIG. 4, the clamp 70 has an upper section 72 and a lower section 74 which are pivotally pinned together at one end by a pin 76. The majority of each clamp section 72 and 74 is curved to correspond to the curved cross-sectional configuration of the coupling assembly made up of the couplings 64 and 66. The ends of the clamp section 72 and 74 opposite the pin 76 terminate in respective outwardly turned forks 72a and 74a. The bottom end of a screw 78 is pinned at 80 between the tines of the lower fork 74a. The screw 78 may be extended between the tines of the upper fork 72a. A thumb nut 82 is threaded onto the top end of screw 78.

Referring again to FIG. 3 in particular, each of the clamp sections 72 and 74 presents a tapered channel 84 on its inside surface. The channel 84 corresponds in shape and size to the mating ends 64a and 66a and to the tapered surfaces 64b and 66b. When the clamp 70 is fully applied in the position shown in FIG. 3, the channel 84 closely receives the mating end portions 64a and 66a and wedges them together by reason of the match between the tapered sides of the channel 84 and the tapered surfaces 64b and 66b.

Referring again to FIG. 4, the clamp 70 can be applied to secure the couplings 64 and 66 together by applying the sections 72 and 74 around the mating ends of the couplings and swinging the screw 78 between the tines of the upper fork 72a with the thumb nut 82 threaded outwardly far enough on screw 78 to overlie the upper fork 72a. The thumb nut 82 can then be tightened on the screw to press forks 72a and 74a together, thus securing the clamp on the ends of the coupling and wedging the mating ends of the couplings securely together. The clamp 70 can be released by loosening the thumb nut 82 by hand until the screw 78 can be swung out from between the tines of the upper fork 72a. The clamp sections 72 and 74 can then be swung away from one another and released from the coupling assembly as shown in broken lines in FIG. 4.

Figure 8:
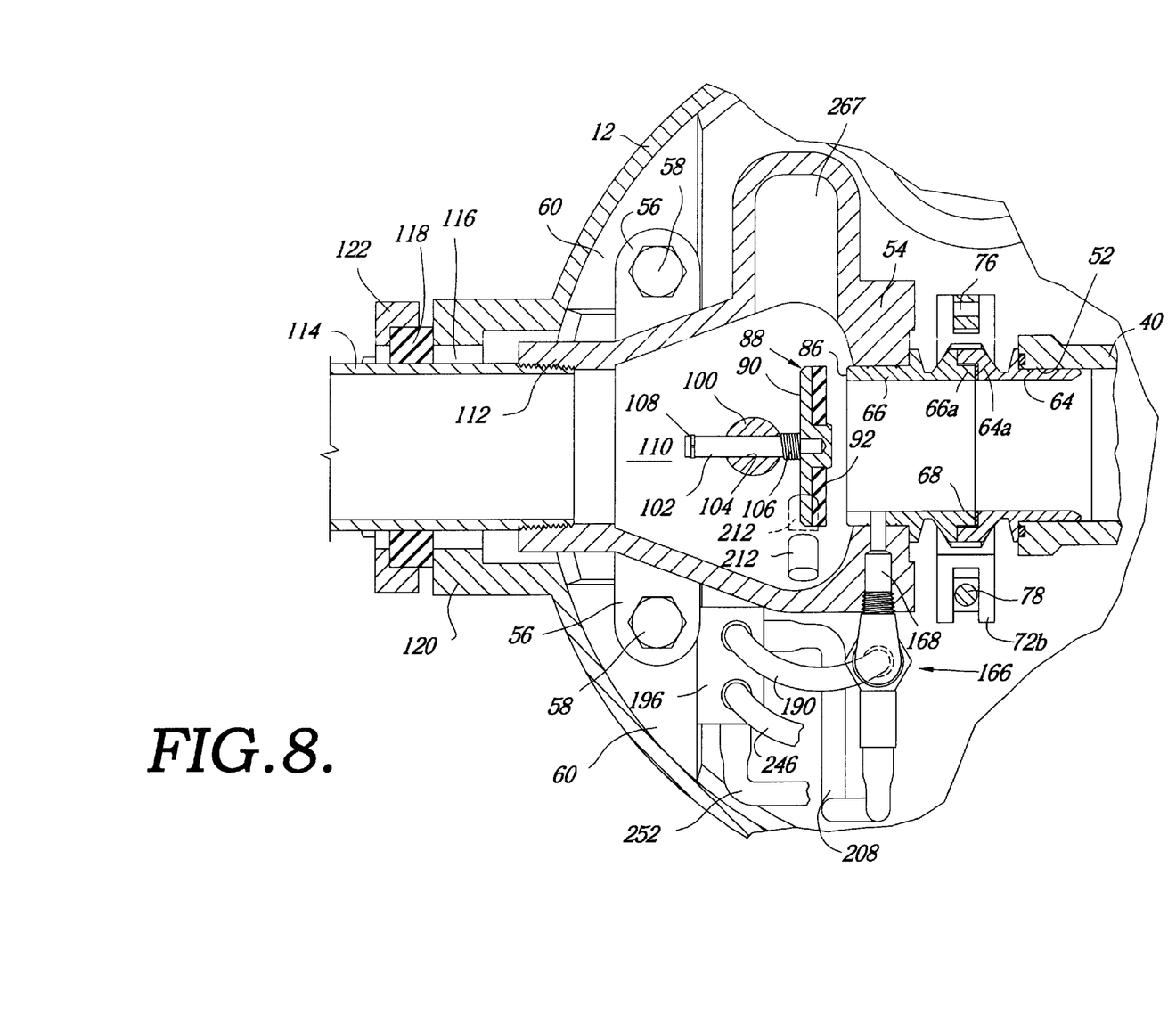
FIG. 8 is a fragmentary sectional view taken on a horizontal plane through the check valve housing and the quick connect coupling assembly installed in the casing.

As best shown in FIGS. 3 and 8, the downstream end of coupling 66 provides an annular valve seat 86. A check valve 88 includes a valve body 90 which takes the form of a disk and a flat seal ring 92 which is carried on the body 90 and seals against the valve seat 86 in the closed position of the check valve shown in FIG. 3. The check valve 88 may be displaced from the closed position to the fully open position shown in FIG. 8 wherein the check valve is spaced away from the valve seat to allow flow from the coupling assembly into the interior of the check valve body 54.

The top of the check valve housing 54 is normally covered by a removable lid 94. The lid 94 is secured to the top of housing 54 by screws 96 and is sealed to the top of the housing by an O-ring 98. A vertical post 100 is secured at its top end in a recess formed in the underside of the lid 94. As shown particularly in FIG. 8, a horizontal stem 102 fits slidably through a transverse passage 104 formed through the bottom portion of the post 100. The check valve body 90 is threaded or otherwise secured on one end of the stem 102. A compression spring 106 is coiled around the stem 102 between post 100 and the valve body 90 in order to continuously urge the check valve 88 toward the valve seat 86. A snap ring 108 is snapped into a groove near the opposite end of the stem 102 in order to prevent the stem 102 from detaching from the post 100. When the lid 94 is removed from the valve housing 54, it is removed as a unit along with the post 100, the valve stem 102 and the check valve 88.

With continued reference to FIGS. 3 and 8 in particular, the interior of the check valve housing 54 provides a flow chamber 110. The part of the flow chamber 110 which is adjacent to the valve seat 86 is considerably larger in cross-sectional area than the flow path provided through the couplings 64 and 66. Accordingly, the flow past the check valve 88 is not restricted to any significant extent and the fuel is able to expand and flow through the large area of the chamber 110 presented around the check valves. The chamber 110 gradually decreases in cross-sectional area as it approaches a cylindrical neck 112 which forms an outlet from the check valve housing 54.

A dispensing pipe 114 which forms part of the fuel line leading from the casing to the fuel dispenser (not shown) extends through an opening 116 in the front side of the casing and is threaded into the neck 112 of the check valve housing 54. A seal ring 118 fits closely around the dispensing pipe 114 and is squeezed between a boss 120 formed on the front side of the casing body 10 and a flange 122. A plurality of screws 124 (see FIG. 3) are extended through the flange 122 and threaded into the boss 120 in order to tightly squeeze the seal ring 118 against the outside surface of the dispensing pipe 114.

Figure 11:
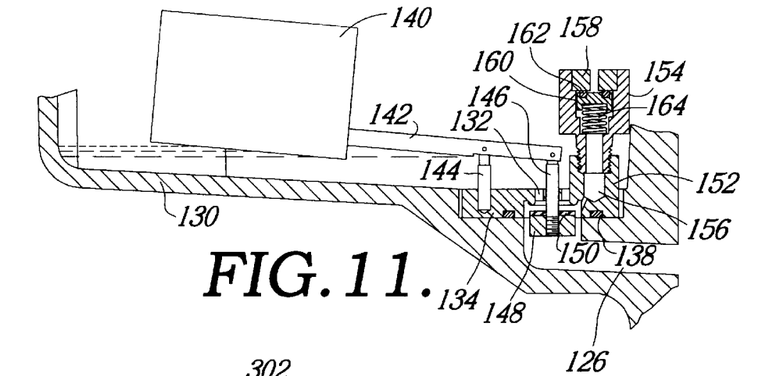
FIG. 11 is a fragmentary sectional view on an enlarged scale taken on a vertical plane and showing the float valve on the floor of the casing in a position to open the floor drain of the casing.

The fluid tight casing 10 provide secondary containment for containing any fuel that leaks from the interior components of the casing. With particular reference to FIGS. 3 and 11, the casing body 12 is provided with a drain passage 126 which leads to an annulus 128 formed between the riser pipe 16 and the column pipe 38. The annular passage 128 returns leaking fuel to the tank 36. The casing body 12 has an inclined floor 130 that inclines gradually downwardly toward a drain port 132 that is formed through a plate 134 and connects with the drain passage 126. The plate 134 is secured in a recess in the floor surface of the casing by screws 136 (see FIG. 4) and is sealed to the floor by a seal ring 138.

A float valve arrangement controls the draining of fuel through the drain port 132. A float 140 which may take the form of a low density block has a lever arm 142 extending from it. A vertical pin 144 has its top end pivoted to an intermediate portion of the arm 142 and its bottom end secured to the plate 134. The end of arm 142 remote from the float 140 is pivoted to the top end of a pin 146 which extends through the drain port 132 and is threaded or otherwise secured at its lower end to a drain plug 148. A seal element 150 is carried on the upper surface of the plug 148 and normally seals the drain port 132 closed (see FIG. 3).

However, when leaking fuel accumulates on the floor 130 to a level sufficient to cause the float 140 to rise (FIG. 11), the linkage associated with the float forces pin 146 downwardly, carrying the plug 148 with it and displacing the seal 150 from the underside of the drain port 132. The drain port 132 is then open, and the fuel drains through it and through the drain passages 126 and 128 back to the fuel tank 18.

With continued reference to FIGS. 3 and 11 in particular, the plate 134 has an upwardly projecting boss 152 at one end which is internally threaded to receive the lower end of a pressure relief valve body 154. The boss 152 has an internal passage 156 which connects with the drain passage 126. The top end of the valve body 154 is equipped with an annular seat 158 against which a poppet 160 carrying a seal ring 162 normally seats. A compression spring 164 acts against the underside of the poppet 160 at its top end and against an interior shoulder in the valve body 154 at its bottom end in order to continuously urge the poppet 160 upwardly toward the closed position shown in FIG. 11 where the seal ring 162 provides a seal against the seat 158. However, if excessive vapor pressure is present within the fluid tight casing body 12, the vapor pressure acting against the poppet 160 overcomes the force of spring 164 and unseats the seal ring 162 from the valve seat 158. A passage is then open through the valve body 154 extending from the interior of the casing body 12 to the drain passage 156. Then, the vapor is vented from the interior of the casing and is directed into the drainage system for return to the tank.

Figure 9:
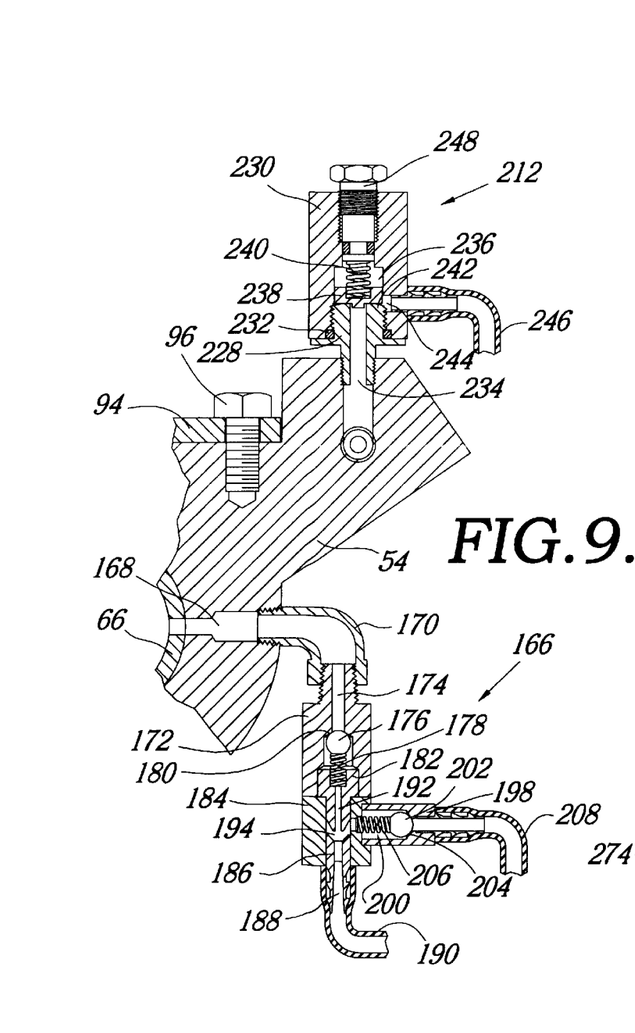
FIG. 9 is a fragmentary sectional view on an enlarged scale taken generally along line 9—9 of FIG. 1 in the direction of the arrows.

A siphon valve which is generally identified by numeral 166 and which is best shown in FIGS. 8 and 9 serves as a vacuum generator for a siphon system that may be used in connection with the casing 10. A passage 168 is formed through the body of the check valve housing 54 and through the coupling 66. Accordingly, the passage 168 connects with the fuel flow path at a location upstream from the check valve seat 86 and the check valve 88 (see FIG. 8 in particular). An elbow fitting 170 is threaded into the outer end of the passage 168. The siphon valve 166 has a body 172 which is threaded at its upper end into the lower end of the elbow 170. The valve body 172 has a central passage 174 which connects with the interior of the elbow fitting 170. A check valve located in the valve body 172 includes a ball 176 which is continuously urged by a compression spring 178 upwardly against a valve seat 180. When the ball 176 is against the seat 180, the passage 174 is closed.

The lower end of spring 178 acts against a nozzle 182 which is fitted into the lower end of the valve body 172. The lower end of the nozzle 182 is received in a fitting 184 having a venturi 186 secured in its lower portion. The venturi 186 has a venturi passage 188 which is relatively narrow on its upstream side and which gradually flares toward its lower or downstream end. A tube 190 is secured to the lower end portion of the venturi 186.

The nozzle 182 has a small central passage 192 which receives fuel from passage 174 when the check valve ball 176 is displaced from the valve seat 180. Passage 190 opens into a low pressure area 194 which is formed within fitting 184 between the discharge end of the nozzle 182 and the inlet end of the venturi 186. A low pressure is generated in area 194 whenever fuel is being pumped through the check valve housing, due to the flow of fuel through passage 186 and against the ball 176 to displace it from the seat 180, thus allowing the fuel to flow through the nozzle and venturi and into tube 190. Tube 190 extends into the top of a manifold block 196 (FIG. 8) which is secured to one of the pedestals 60. A fitting 198 secured to fitting 184 has a passage 200 connected with the low pressure chamber 194. A check valve ball 202 located in the passage 200 is continuously urged toward a valve seat 204 by a compression spring 206. A tube 208 is connected with the outer end of fitting 198 to transmit the vacuum from the low pressure area 194. When fluid is flowing through the fuel path in the casing 10, the ball 202 is displaced from the valve seat 204 due to the vacuum created in the low pressure chamber 194, thus allowing air to flow through tube 208 and past the ball 202 to the low pressure area 194. As shown in FIG. 8, the siphon tube 208 connects with one side of the manifold block 196.

Figure 6:
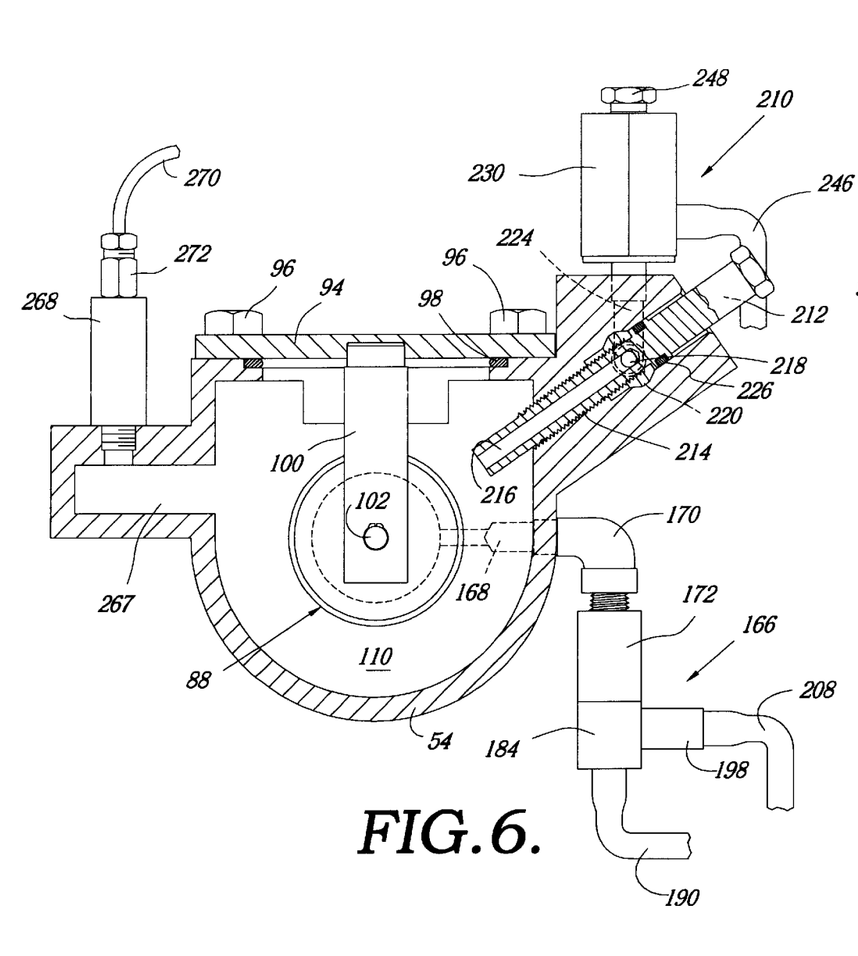
FIG. 6 is a fragmentary sectional view taken generally along line 6—6 of FIG. 1 in the direction of the arrows, with the locking screw in its retracted position.
Figure 7:
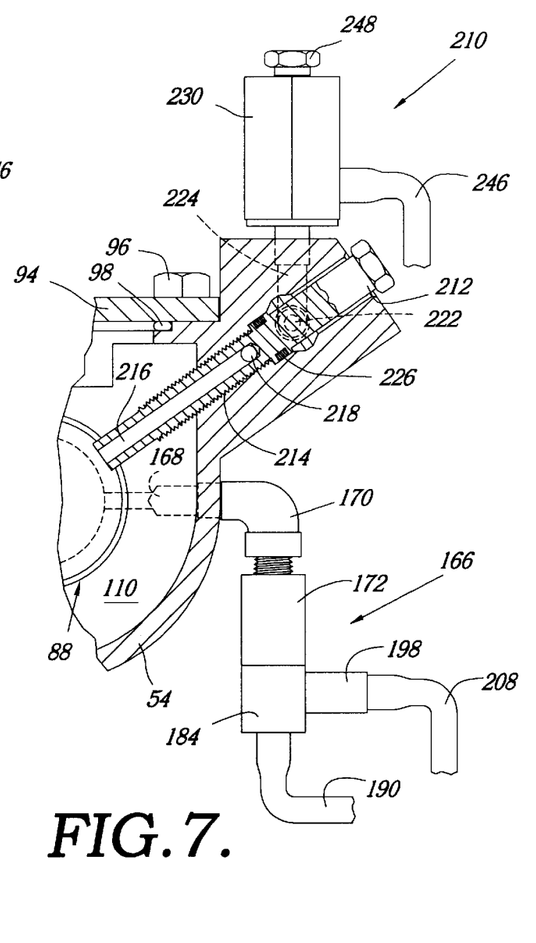
FIG. 7 is a fragmentary sectional view similar to FIG. 6, but showing the locking screw in its fully extended position to limit travel of the check valve element.

Excessive pressure in the check valve housing 54 is relieved by an expansion relief valve generally identified by numeral 210. With particular reference to FIGS. 6 and 7, the fuel pressure downstream from the check valve is applied to the expansion relief valve 210 by a locking screw 212 which is threaded at 214 into the body of the check valve housing 54. The shank of screw 212 has an axial passage 216 which opens into the check valve housing. The upper end of passage 216 terminates at a side port 218. When the locking screw 212 is threaded outwardly to the retracted position shown in FIG. 6, the side port 218 opens into a chamber 220 formed within the body of the check valve housing 54. A lateral passage 222 (FIG. 7) extends in the body of the check valve housing to connection with a vertical passage 224 which extends to the expansion relief valve 210. Consequently, in the fully retracted position of screw 212 (the position of FIG. 6), the fuel within the check valve housing 54 is applied through passage 216 and port 218 and then through passages 222 and 224 to the expansion relief valve 210. Above the port 218, the screw 212 is provided with a groove which carries an O-ring 226. In the retracted position of FIG. 6, the O-ring 226 seals against leakage of fuel out of the check valve housing through the passage that receives the locking screw 212.

The locking screw 212 can be threaded into the check valve housing to the fully extended position shown in FIG. 7 where it isolates the expansion relief valve 210 from the fuel and also acts to restrict the travel of the check valve 88 and thus restrict the flow into the check valve housing. At times when a test of the line pressure is being carried out, it is necessary to isolate the fuel pressure from the expansion valve and to restrict the flow into the check valve housing, and both functions are accomplished by moving the locking screw 212 to the fully extended position.

In the fully extended position, the tip of the check valve extends inwardly behind the check valve 88 in order to restrict its movement away from the valve seat 86. FIG. 8 depicts the fully open position of the check valve 88. As indicated by the broken lines in FIG. 8, full extension of the locking screw into the check valve housing puts the tip of the locking screw in a position to interfere with movement of the check valve to the fully open position. Instead, the check valve is restricted to movement carrying it only a short distance away from the seat 86, thus creating a flow restriction for line testing purposes.

Referring again to FIG. 7, the port 218 and the O-ring 226 are both located well below the chamber 220 when the locking screw 212 is fully extended. Consequently, the flow path between passages 216 and 224 is interrupted, and the expansion relief valve 210 is isolated from the fluid pressure in the check valve housing 54.

The construction of the expansion relief valve 210 is best shown in FIG. 9. A fitting 228 is threaded into the upper end of passage 224. The expansion relief valve 210 has a body 230 which is threaded onto the fitting 228 and sealed to the fitting by an O-ring 232. The fitting 228 has a central passage 234 which connects with passage 224 and at times with a chamber 236 formed within the valve body 230. A poppet valve element 238 is continuously urged by a compression spring 240 toward a seat 242 formed on the upper end of fitting 228. When the poppet seats against the valve seat 242, the poppet blocks flow from passage 234 into chamber 236. When the poppet 238 is open, chamber 236 connects with an outlet port 244 formed in the side of the valve body 230. The port 244 connects with a tube 246 which extends to connection with the top of the manifold block 196 (see FIG. 8).

With continued reference to FIG. 9 in particular, it is evident that when the fluid pressure transmitted through passage 234 is sufficient to overcome the force of the compression spring 240, the poppet 238 is unseated from the seat 242, thus allowing fluid to flow into chamber 236 and then through the tube 246 in order to relieve excessive pressure in the check valve housing 54. The force applied by the spring 240 can be adjusted by means of a threaded plug 248 which is threaded into the top of the valve body 230 and has its lower end engaged against the top end of spring 240. Thus, the force of spring 240 can be reduced by threading plug 248 upwardly out of the valve body, and the spring force can be increased by threading the plug 248 downwardly into the valve body.

The manifold block 196 provides a connection for the siphon system with the siphon line 208. A chamber (not shown) located within the manifold block 196 connects with the siphon line 208 and with a line extending out of the manifold block which may be connected with the siphon system. As shown in FIG. 2, a pipe plug 250 may be installed to seal off the siphon system.

The manifold block 196 also combines the fuel that is returned from the siphon return line 190 and the expansion relief return line 246 in an internal chamber (not shown) formed within the manifold block. This chamber connects with a return line 252 (FIG. 8). As shown in FIG. 1, line 252 extends to connection with the boss 42 on which the power head 40 is mounted. The fuel returning through line 252 is delivered to a passage 254 (FIG. 1) which is formed within the boss 42 and which connects with a vertical passage 256 (FIG. 5) which extends upwardly to the top end of the boss 42. As shown in FIG. 5, the top end of passage 256 connects with an inclined passage 258 which extends within the body of the power head 40 adjacent to the base 44. An O-ring 260 provides a seal between passages 256 and 258. The top end of passage 258 connects with a vertical passage 262 which extends downwardly within the body of the power head 40 and which connects at its lower end with a vertical tube 264. An O-ring 266 provides a seal at the junction between passage 262 and the tube 264. The tube 264 extends downwardly in the annulus 128 formed between the riser pipe 16 and the column pipe 38. As previously indicated, the annulus 128 connects with the storage tank 18, so the fuel which is returned through tube 264 is directed back into the tank 18.

As shown particularly in FIG. 6, the check valve housing 54 is provided on one side with a relatively small chamber 267. The chamber 267 opens into the interior of the check valve housing 54 and is downstream from the valve seat 86. A pressure transducer 268 is threaded to the top of the chamber 267 and senses the fuel pressure therein. The fuel pressure sensed by the transducer 268 is transmitted as an electrical signal through a cable 270. A compression fitting 272 is threaded to the top of the transducer 268 with the cable 270 extending through the fitting. The fitting 272 provides a seal around the cable 270 and also provides strain relief for the cable.

As best shown in FIG. 4, a junction box 274 is mounted within the casing body 12 on a ledge 276 located near one side of the casing. The top of the junction box 254 is provided with a threaded opening into which a safety barrier plug 278 is tightly threaded. A threaded passage 280 is formed through the top portion of the plug 278. The transducer cable 270 extends through a compression fitting 282 and connects with a safety barrier board 284. The fitting 282 is threaded into the passage 280 to seal against the cable 270 and provides strain relief for the cable. The safety barrier board 284 is encapsulated in the plug 278.

The junction box 274 has an externally threaded neck 286 which projects downwardly through an opening formed in the ledge 276. A washer 288 is fitted on the neck 286, and a jam nut 290 is threaded onto the neck and tightened to secure the junction box 274 on the ledge 276. An O-ring 292 provides a seal around the opening in ledge 276.

An electrical conduit 294 is threaded into the neck 286. The conduit 294 contains a plurality of wires 296 which include electrical lead wires, a ground wire, and the transducer cable. The wires 296 lead to an electrical power source (not shown) which is normally housed in a nearby building and also to a controller which processes the electrical signal from the pressure transducer and adjusts the operation of the pump 36 accordingly (preferably, in a manner to maintain constant pressure in the check valve housing under normal operation).

Figure 10:
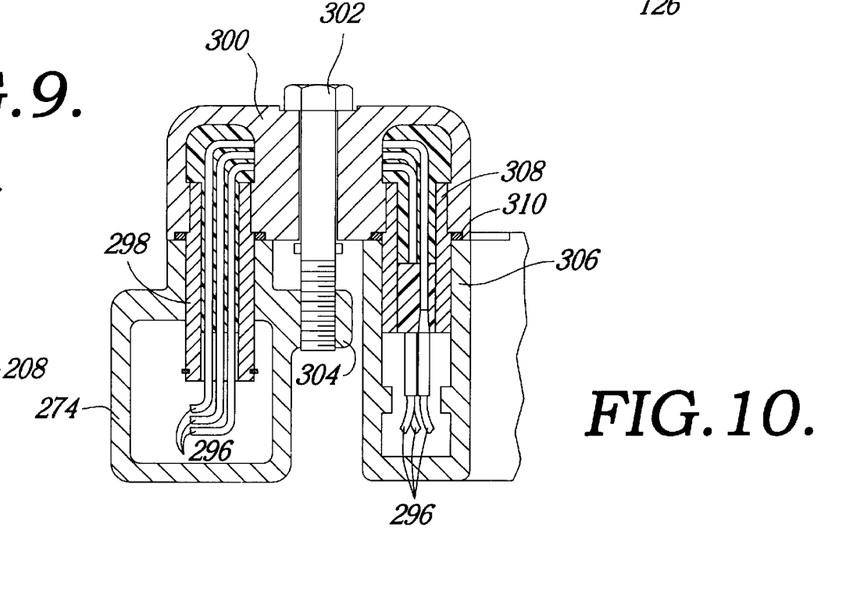
FIG. 10 is a fragmentary sectional view on an enlarged scale taken generally along line 10—10 of FIG. 1 in the direction of the arrows.

Within the junction box 274, the electrical conductor wires 296 extend into a tube 298. Referring now to FIG. 10 in particular, the tube 298 extends upwardly into a yoke 300. A bolt 302 extends through the yoke 300 and is threaded into a lug 302 extending from the junction box 274. This secures part of the yoke 300 on top of the junction box 274 and another part of the yoke on top of a wing 306 which projects from the body of the power head 40. An O-ring 308 seals the joint between the yoke 300 and the junction box 274 around the tube 298. The conductor wires 296 extend upwardly through the tube 298 and sidewardly through the yoke 300 through insulated passages.

Another tube 308 extends partially within the yoke 300 and partially within the power head wing 306. An O-ring 310 extends around tube 308 to provide a seal at the junction between the yoke 300 and the power head wing 306. The electrical conductor wires 296 extend downwardly through insulated passages in the tube 308 into the wing 306. As shown in FIG. 3, the wires 296 extend from the wing 306 into a cylindrical dome 312 which is an integral part of the body of the power head 40. The dome 312 is located on the upper portion of the power head 40 above the flow path 50 and aligned directly above the column pipe 38. A removable cap 314 is threaded onto the top of the dome 312 and may be removed to provide access to the wires 296.

The wires 296 extend through a conduit adapter 316 which is threaded onto the top end of an electrical conduit 318. The adapter 316 is secured in a passage extending from the interior of the dome 312 to the flow passage 50 and is provided with an O-ring 320 which seals the interior of the dome 312 from the flow path 50. The conduit 318 receives the wires 296 and extends downwardly centrally within the column pipe 38 to connection with the pump 36. The wires 296 provide electrical power for operating the submersible pump 36.

In operation of the fuel dispensing system, it is contemplated that the pump 36 will be controlled in a manner to provide constant pressure when the pump is operating so that the flow of the fuel is maintained substantially constant. The pump 36 pumps fuel from the tank 18 upwardly through the column pipe 38 and then through the flow passage 50 in the power head and through the couplings 64 and 66. The force of the fluid that is being pumped overcomes the force of spring 106 and displaces the check valve 88 from the seat 86 to the fully open position shown in FIG. 8. The fuel then flows into the check valve housing 54 and past the check valve 88.

Because of the large size of the check valve housing in the vicinity of the check valve 88, the flow is not significantly restricted and is able to flow through the dispensing pipe 114 to the fuel dispenser without significant disruptions caused by flow restrictions.

When the pump is deenergized, the spring 106 presses the check valve 88 against the seat 86, and the check valve thus maintains pressure downstream in the check valve housing and dispensing line 114. When the pump is again energized, this fuel is immediately available at the dispenser.

Any fuel that leaks within the casing body 12 accumulates on the floor 130. When the fuel level on the floor 130 reaches an excessive level, the float 140 is lifted to the position shown in FIG. 11 wherein the plug 148 is displaced from the underside of the drain opening 132, thus opening the drain port and allowing the fuel to flow back into the tank through the drain line 126 and the annular space 128.

In the event there is excessive fuel vapor pressure within the casing 10, the poppet 180 is forced away from seat 158 by the vapor pressure, thus relieving the vapor pressure through the pressure relief valve and through passages 156 and 126 to the annular drain passage 128.

Referring particularly to FIG. 9, the siphon valve 166 allows fluid upstream from the valve seat 86 to flow through passages 168 and 174 to displace the ball 176 from its seat 180, thus allowing the fluid to flow through the nozzle 182 and the venturi 186 and through line 190 back to the manifold block which returns it to the tank through the return line 252. The nozzle 182 and venturi 186 create a low pressure in the chamber 194, thus creating a siphon effect which displaces the ball 202 from its seat 204 and opening the siphon line 208 for operation of the siphon system.

Normally, the locking screw 212 is in the fully retracted position shown in FIG. 6, and fuel from a location downstream from the valve seat 86 is thus able to flow to the expansion relief valve 210 through passages 216, 222 and 224. If the fuel pressure is excessive, the poppet 238 is displaced from its seat 242 due to the force of the fuel flowing in passage 234, and the excess fuel pressure is relieved through port 244 and line 246 to the manifold block 196 which returns the fuel to the tank through the return line 252.

The manner in which the electrical wiring 296 extends through the casing assures its isolation from any fuel or fuel vapors in the casing 10. In addition, the provision of the intrinsic safety barrier plug 278 at the location of the junction box allows the transducer cable 270 to extend through the vapor zone within the casing body 12 without creating safety hazards or other problems adversely affecting the operation of the transducer 268 or any related components.

When maintenance is to be performed on the components held by the casing 10, the cover 22 can be quickly and easily removed by removing the bolts 64 and lifting the cover off of the body 12. This provides access to all of the interior components.

In order to inspect or repair the check valve 88, all that is required is that the screws 96 be removed and that lid 94 be lifted off of the check valve housing 54. The lid 94, post 100, valve stem 102 and check valve 88 are all removed together as a unit so that there is no need to remove and replace additional components which would create complexity in the maintenance operation.

The power head 40, column pipe 38 and pump 36 can also be removed as a unit in order to inspect or replace the pump or any related components. With the casing cover 22 removed, the clamp 70 is readily accessible. The clamp can be released by unthreading the thumb nut 82 from the screw 78 and then swinging the screw out of the area between the tines of the upper fork 72a. The clamp sections 72 and 74 can then pivot to the open position shown in broken lines in FIG. 4 where the clamp is released from the couplings 64 and 66. The power head cap 314 can be removed to provide access for disconnection of the wiring, and the couplings 64 and 66 can be disconnected. Once the mounting bolts 48 for the power head 40 have been removed, the entire assembly of the power head, column pipe and pump can be lifted upwardly out of the casing for inspection and repair. Reassembly of the power head, column pipe and pump can be carried out quickly and easily by reversing this procedure.

It is thus evident that the casing 10 of the present invention provides an improved fluid and electrical interface between the components of a fuel dispensing system. In addition to the simple and economical construction of the unit, it provides for quick and easy maintenance operations and, perhaps most importantly, allows the system to operate with increased safety.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A fuel dispensing system having an underground tank for holding fuel, a column pipe extending from the tank, a pump for pumping fuel from the tank through the column pipe, a dispensing pipe for delivering the fuel to a dispenser, a power supply line connected with an electrical power source, and a power delivery line extending through the column pipe to deliver electrical power to the pump, wherein the improvement comprises:

a fluid tight casing having a removable cover providing access to the interior of the casing when removed, said casing serving to confine fuel that leaks therein;

a power head in said casing connected with the column pipe to receive fuel therefrom, said power head providing a flow path for directing the fuel toward said dispensing pipe;

a check valve housing in said casing between said power head and dispensing pipe to direct fuel therebetween;

a check valve for controlling flow from said flow path of the power head to the dispensing pipe;

an enclosed junction box in said casing receiving said power delivery line;

means in said casing for electrically connecting said delivery line in the junction box to said supply line in the power head in a manner to isolate all electrical lines from the fuel flowing in said casing;

a discharge opening from said power head;

an inlet opening to said check valve housing substantially aligned with said discharge opening;

a releaseable coupling assembly including first and second coupling members connected respectively with the discharge opening and the inlet opening, said coupling members having mating ends which seal together in a coupled position to provide a sealed flow passage from the discharge opening to the inlet opening, said coupling assembly having a release position wherein said mating ends are separable to allow the power head to be extracted from the casing along with the column pipe and pump; and means for effecting the coupled and release positions by hand when the cover of the casing is removed.

2. The improvement of claim 1, wherein said flow path provided by the power head effects a turn through approximately 90° from a substantially vertical direction through the column pipe to a substantially horizontal direction prior to discharging from the power head.

3. The improvement of claim 1, wherein said means for effecting the coupled and release positions comprises a clamp having a closed position holding said mating ends together and a release position releasing said mating ends, said clamp being adapted for manipulation by hand between the release and closed positions thereof.

4. The improvement of claim 3, including:

tapered surfaces on said coupling members adjacent said mating ends thereof; and a tapered channel on said clamp for engagement with said tapered surfaces to wedge said mating ends together in the closed position of the clamp.

5. The improvement of claim 3, wherein said clamp includes:

a pair of clamp sections each having a pivot end and a fastening end;

means for pivoting said sections together at the pivot ends thereof for pivotal movement between the release and closed positions; and hand releaseable fastening means for fastening said fastening ends together and progressively tightening said fastening ends in the closed position.

6. The improvement of claim 1, including:

a floor of said casing;

a drain port in said floor for draining away fuel leaking into the casing;

a drain passage leading from said drain port to the tank; and a drain closure normally closing said drain port but acting to open the port when leaking fuel in the casing reaches a preselected level on the casing floor.

7. The improvement of claim 6, including:

a pressure relief port in said casing connected with said drain passage; and valve means for normally maintaining said relief port closed, said valve means acting in response to vapor pressure in said casing above a preselected level to open the relief port to relieve the vapor pressure therethrough.

8. The improvement of claim 6, including:

a float adjacent the floor of the casing floating on fuel that accumulates on said floor; and a linkage between said float and drain closure acting to hold the closure closed against said drain port when the float is below said preselected level and to open the closure to expose the drain port when the float reaches said preselected level.

9. The improvement of claim 1, including:

a relief port in said casing for relieving excess vapor pressure therein;

a drain passage leading from said relief port to the tank; and valve means for normally maintaining said relief port closed, said valve means acting in response to vapor pressure in said casing above a preselected level to open the relief port to relieve the vapor pressure therethrough.

10. The improvement of claim 1, including:

a drain line extending from said power head to the tank to return fuel to the tank;

means for establishing a fuel return line extending to said drain line from a location in said check valve housing upstream from the check valve;

a check valve in said fuel return line opening the fuel return line when the pump is operating and closing the return line when the pump is inactive;

means for effecting a low pressure area in said fuel return line when fuel is flowing therethrough;

a siphon line extending from said low pressure area to transmit the low pressure; and a check valve in said siphon line effective to open the siphon line when the pressure in said low pressure area is below a selected level and to close the siphon line when the pressure in said low pressure area is above said selected level.

11. The improvement of claim 10, including:

an expansion relief line extending to said drain line from a location in said check valve housing downstream from the check valve; and an expansion relief valve for normally closing said relief line, said relief valve opening said relief line when the pressure therein transmitted from the check valve housing exceeds a preselected level.

12. The improvement of claim 1, including:

a drain line extending from said power head to the tank to return fuel to the tank;

an expansion relief line extending to said drain line from a location in said check valve housing downstream from the check valve; and an expansion relief valve for normally closing said relief line, said relief valve opening said relief line when the pressure therein transmitted from the check valve housing exceeds a preselected level.

13. The improvement of claim 12, wherein said check valve includes:

a valve seat through which fuel passes into the check valve housing toward the dispensing pipe;

a valve element movable from a closed position against the seat to a fully open position spaced away from the seat a selected distance;

yieldable means for maintaining said valve element against the seat unless the force of fuel pumped by said pump exceeds a level necessary to dislodge said valve element from the seat to the fully open position; and means for closing said expansion relief valve irrespective of the pressure in said check valve housing and simultaneously restricting the valve element movement to less than said selected distance to establish a partially open position of the valve element.

14. The improvement of claim 13, wherein said means for closing said expansion valve comprises:

an adjustable locking element having a connection with said check valve housing, said locking element having an extended position interfering with movement of said valve element past the partially open position and a retracted position allowing the valve element to move to the fully open position;

a passage in said locking element forming a part of said expansion relief line adjacent the check valve housing, said passage having an outlet port connected with the remainder of the expansion relief line in the retracted position of said locking element and disconnected from the remainder of the expansion relief line in the extended position of said locking element; and means for sealing said port from the remainder of the expansion relief line in the extended position of the locking element.

15. The improvement of claim 1, including:

a pressure transducer mounted on the check valve housing and acting to sense the pressure therein at a location downstream from the check valve;

a plug having a threaded connection with said junction box;

a transducer cable for transmitting an electrical signal indicative of the pressure sensed by said transducer, said cable extending from said transducer into said junction box through said plug; and a barrier board encapsulated in said plug, said cable terminating at said board to transmit said electrical signal thereto.

16. The improvement of claim 1, including:

a removable lid for said check valve housing accessible for removal from the check valve housing when the cover is removed from said casing;

a mounting post carried on said lid and normally located in said check valve housing;

a valve seat in the check valve housing;

a valve stem carried on said post, said check valve being mounted on said stem for movement thereon between a closed position against the seat and an open position displaced from the seat to allow fuel to flow into the check valve housing toward the dispensing pipe; and yieldable means for urging said check valve to the closed position, said yieldable means being overcome when the force of fuel pumped through the power head exceeds a predetermined level, said lid, post, stem and check valve being removable as a unit from the check valve housing.

17. In a fuel dispensing system having a casing which provides a fuel flow path from an underground tank to a dispensing pipe and which provides for transmission of electrical power to a submersible pump in the tank, the improvement comprising:

a check valve housing forming part of said fuel flow path and presenting a valve seat;

a removable cover on said check valve housing accessible for detachment from the housing when said casing is open;

a mounting post carried on said cover;

a valve stem carried on said post;

a check valve element mounted on said stem for movement thereon between a closed position against the seat to close the flow path and an open position displaced from the seat to allow fuel to flow into the housing toward the dispensing pipe, said cover, post, stem and valve element being detachable as a unit from the check valve housing and removable as a unit from the casing; and yieldable means for maintaining said valve element in the closed position when the force against the valve element applied by fuel pumped through said flow path is below a predetermined level sufficient to overcome said yieldable means and move the valve element to the open position.

18. The improvement of claim 17, wherein said check valve housing presents a cross-sectional area adjacent to said valve seat that exceeds the cross-sectional area of the dispenser pipe and the cross-sectional area of the flow path upstream from said valve seat.

19. In a fuel dispensing system having an underground fuel tank and a dispensing pipe, the improvement comprising:

a casing having a removable top cover;

a submersible pump in the tank;

a column pipe leading from the tank to the casing and carrying said pump to direct fluid from the tank to the casing;

a power head in the casing to which said column pipe and pump are connected, said power head defining a fuel flow path therethrough for accommodating fuel pumped through said column pipe;

a check valve housing for directing fuel from the power head to the dispensing pipe;

a check valve in said housing arranged to open when the pump is active and close when the pump is inactive;

first and second coupling members connected respectively to the power head and check valve housing;

mating ends on said coupling members which seal together in a coupled position of said members to provide a sealed passage for fuel flow from the power head to the valve housing, said mating ends being separable from one another to allow the coupling members to be released and allow the power head to be removed from the casing along with the column pipe and pump when the top cover of the casing is removed; and a releasable clamp for securing said coupling members in the coupled position, said clamp including a pair of clamp sections pivoted together at one end and arranged to be pivoted closed around said mating ends and tightened therearound to seal said mating ends together.

20. The improvement of claim 19, including:

tapered surfaces on said coupling members adjacent said mating ends thereof; and a tapered channel on said clamp engageable against said tapered surfaces to wedge said mating ends together when the clamp sections are tightened around them.

21. A fuel dispensing system having an underground tank for holding fuel, a column pipe extending from the tank, a pump for pumping fuel from the tank through the column pipe, a dispensing pipe for delivering the fuel to a dispenser, a power supply line connected with an electrical power source, and a power delivery line extending through the column pipe to deliver electrical power to the pump, wherein the improvement comprises:

a fluid tight casing having a removable cover providing access to the interior of the casing when removed, said casing serving to confine fuel that leaks therein;

a power head in said casing connected with the column pipe to receive fuel therefrom, said power head providing a flow path for directing the fuel toward said dispensing pipe;

a check valve housing in said casing between said power head and dispensing pipe to direct fuel therebetween;

a check valve for controlling flow from said flow path of the power head to the dispensing pipe;

an enclosed junction box in said casing receiving said power delivery line;

means in said casing for electrically connecting said delivery line in the junction box to said supply line in the power head in a manner to isolate all electrical lines from the fuel flowing in said casing;

a floor of said casing;

a drain port in said floor for draining away fuel leaking into the casing;

a drain passage leading from said drain port to the tank; and a drain closure normally closing said drain port but acting to open the port when leaking fuel in the casing reaches a preselected level on the casing floor.

22. The improvement of claim 21, including:

a pressure relief port in said casing connected with said drain passage; and valve means for normally maintaining said relief port closed, said valve means acting in response to vapor pressure in said casing above a preselected level to open the relief port to relieve the vapor pressure therethrough.

23. The improvement of claim 21, including:

a float adjacent the floor of the casing floating on fuel that accumulates on said floor; and a linkage between said float and drain closure acting to hold the closure closed against said drain port when the float is below said preselected level and to open the closure to expose the drain port when the float reaches said preselected level.

24. A fuel dispensing system having an underground tank for holding fuel, a column pipe extending from the tank, a pump for pumping fuel from the tank through the column pipe, a dispensing pipe for delivering the fuel to a dispenser, a power supply line connected with an electrical power source, and a power delivery line extending through the column pipe to deliver electrical power to the pump, wherein the improvement comprises:

a fluid tight casing having a removable cover providing access to the interior of the casing when removed, said casing serving to confine fuel that leaks therein;

a power head in said casing connected with the column pipe to receive fuel therefrom, said power head providing a flow path for directing the fuel toward said dispensing pipe;

a check valve housing in said casing between said power head and dispensing pipe to direct fuel therebetween;

a check valve for controlling flow from said flow path of the power head to the dispensing pipe;

an enclosed junction box in said casing receiving said power delivery line;

means in said casing for electrically connecting said delivery line in the junction box to said supply line in the power head in a manner to isolate all electrical lines from the fuel flowing in said casing;

a drain line extending from said power head to the tank to return fuel to the tank;

an expansion relief line extending to said drain line from a location in said check valve housing downstream from the check valve; and an expansion relief valve for normally closing said relief line, said relief valve opening said relief line when the pressure therein transmitted from the check valve housing exceeds a preselected level.

25. The improvement of claim 24, wherein said check valve includes:

a valve seat through which fuel passes into the check valve housing toward the dispensing pipe;

a valve element movable from a closed position against the seat to a fully open position spaced away from the seat a selected distance;

yieldable means for maintaining said valve element against the seat unless the force of fuel pumped by said pump exceeds a level necessary to dislodge said valve element from the seat to the fully open position; and means for closing said expansion relief valve irrespective of the pressure in said check valve housing and simultaneously restricting the valve element movement to less than said selected distance to establish a partially open position of the valve element.

26. The improvement of claim 25, wherein said means for closing said expansion valve comprises:

an adjustable locking element having a connection with said check valve housing, said locking element having an extended position interfering with movement of said valve element past the partially open position and a retracted position allowing the valve element to move to the fully open position;

a passage in said locking element forming a part of said expansion relief line adjacent the check valve housing, said passage having an outlet port connected with the remainder of the expansion relief line in the retracted position of said locking element and disconnected from the remainder of the expansion relief line in the extended position of said locking element; and means for sealing said port from the remainder of the expansion relief line in the extended position of the locking element.

27. A fuel dispensing system having an underground tank for holding fuel, a column pipe extending from the tank, a pump for pumping fuel from the tank through the column pipe, a dispensing pipe for delivering the fuel to a dispenser, a power supply line connected with an electrical power source, and a power delivery line extending through the column pipe to deliver electrical power to the pump, wherein the improvement comprises:

a fluid tight casing having a removable cover providing access to the interior of the casing when removed, said casing serving to confine fuel that leaks therein;

a power head in said casing connected with the column pipe to receive fuel therefrom, said power head providing a flow path for directing the fuel toward said dispensing pipe;

a check valve housing in said casing between said power head and dispensing pipe to direct fuel therebetween;

a check valve for controlling flow from said flow path of the power head to the dispensing pipe;

an enclosed junction box in said casing receiving said power delivery line;

means in said casing for electrically connecting said delivery line in the junction box to said supply line in the power head in a manner to isolate all electrical lines from the fuel flowing in said casing;

an adjustable locking element having a connection with said check valve housing, said locking element having an extended position interfering with movement of said valve element past the partially open position and a retracted position allowing the valve element to move to the fully open position;

a passage in said locking element forming a part of said expansion relief line adjacent the check valve housing, said passage having an outlet port connected with the remainder of the expansion relief line in the retracted position of said locking element and disconnected from the remainder of the expansion relief line in the extended position of said locking element; and means for sealing said port from the remainder of the expansion relief line in the extended position of the locking element.

28. A fuel dispensing system having an underground tank for holding fuel, a column pipe extending from the tank, a pump for pumping fuel from the tank through the column pipe, a dispensing pipe for delivering the fuel to a dispenser, a power supply line connected with an electrical power source, and a power delivery line extending through the column pipe to deliver electrical power to the pump, wherein the improvement comprises:

a fluid tight casing having a removable cover providing access to the interior of the casing when removed, said casing serving to confine fuel that leaks therein;

a power head in said casing connected with the column pipe to receive fuel therefrom, said power head providing a flow path for directing the fuel toward said dispensing pipe;

a check valve housing in said casing between said power head and dispensing pipe to direct fuel therebetween;

a check valve for controlling flow from said flow path of the power head to the dispensing pipe;

an enclosed junction box in said casing receiving said power delivery line;

means in said casing for electrically connecting said delivery line in the junction box to said supply line in the power head in a manner to isolate all electrical lines from the fuel flowing in said casing;

a removable lid for said check valve housing accessible for removal from the check valve housing when the cover is removed from said casing;

a mounting post carried on said lid and normally located in said check valve housing;

a valve seat in the check valve housing;

a valve stem carried on said post, said check valve being mounted on said stem for movement thereon between a closed position against the seat and an open position displaced from the seat to allow fuel to flow into the check valve housing toward the dispensing pipe; and yieldable means for urging said check valve to the closed position, said yieldable means being overcome when the force of fuel pumped through the power head exceeds a predetermined level, said lid, post, stem and check valve being removable as a unit from the check valve housing.

* * * * *